United States Patent [19]

Languillat

[11] Patent Number: 4,889,023

[45] Date of Patent: Dec. 26, 1989

[54] TUBE TRUNCATION APPARATUS AND METHOD

[75] Inventor: Jean-Paul Languillat, Vallieres par Thorigny-sur-Oreuse, France

[73] Assignee: Lhomme S.A., Pont-sur-Yonne, France

[21] Appl. No.: 924,443

[22] Filed: Oct. 29, 1986

[30] Foreign Application Priority Data

Oct. 30, 1985 [FR] France ................................ 85 16135

[51] Int. Cl.⁴ ................................................ B23B 3/04

[52] U.S. Cl. ............................................ 82/92; 82/93; 82/101; 82/53.1; 83/54; 83/178; 493/288

[58] Field of Search ................ 82/57, 53.1, 58, 82–85, 82/89, 92–94, 101, 47; 83/54, 178, 187, 195; 493/288

[56] References Cited

U.S. PATENT DOCUMENTS

| | | | |
|---|---|---|---|
| 2,600,254 | 6/1952 | Lysobey | 83/178 |
| 2,607,074 | 8/1952 | Slaughter . | |
| 2,699,099 | 1/1955 | Robinson | 493/288 |
| 3,933,090 | 1/1976 | Reynolds | 82/101 |
| 4,299,147 | 11/1981 | Rogers | 82/53.1 |
| 4,591,405 | 5/1986 | Languillat | 156/446 |
| 4,645,553 | 2/1987 | Languillat . | |
| 4,693,149 | 9/1987 | Sireix | 82/101 |
| 4,693,919 | 9/1987 | Languillat . | |
| 4,713,992 | 12/1987 | Languillat . | |

FOREIGN PATENT DOCUMENTS

| | | |
|---|---|---|
| 0125175 | 11/1984 | European Pat. Off. . |
| 1778323 | 9/1971 | Fed. Rep. of Germany . |
| 2015921 | 10/1971 | Fed. Rep. of Germany . |

*Primary Examiner*—Frederick R. Schmidt
*Assistant Examiner*—Robert Showalter
*Attorney, Agent, or Firm*—Sandler & Greenblum

[57] ABSTRACT

An apparatus and method of truncating a tube by having a knife act against a counter-knife which is positioned within the interior of the tube. The counter-knife is maintained in a desired position with respect to the knife by a magnetic apparatus.

4 Claims, 4 Drawing Sheets

TUBE TRUNCATION APPARATUS AND METHOD

BACKGROUND OF THE INVENTION

1. Field of the Invention

The present invention relates to a tube truncation apparatus and method.

2. Description of Background and Relevant Materials

It is known to truncate tubes by means of knives which penetrate through the thickness of the tube while the tube is rotated.

To truncate certain tubes and more particularly tubes made of a material which is only slightly rigid, such as tubes made of cardboard, it is necessary to position a counterpart within the interior of the tube on which the knife terminates its cut.

Until now, the counterpart was mechanically connected by means disposed within the tube so as to assure its fixed positioning or to allow for its longitudinal displacement.

Truncators adapted to cut unitary tubes into a plurality of truncated portions are in effect provided with knives and a longitudinally fixed counterpart, the longitudinal counterpart being fitted on a fixed mandrel on which the tube is fitted.

Conversely, in truncation apparatus for truncating a continuously formed tube, such as a spiraler for cardboard tube for example, it is necessary that the one or more knives and the counterpart follow longitudinally in a synchronous manner the tube in the course of manufacture, at the moment of cut. The knives and the counterpart are then brought back to the initial position after each truncation by a means passing through the winding mandrel of the spiraler.

It is clear that the mechanical connection of the counterpart is a handicap which prevents certain applications in particular.

For a truncator of unitary tubes, for example, the manner in which tubes were supplied until now necessarily occured on the same side as the discharge of the truncated portions because access to one side is forbidden by the linkage of the counterpart, and which would interfere with or prevent continuous supply.

In the truncation apparatus of a continuously manufactured tube it is not always possible to pierce or utilize the interior of the rolling mandrel when, for example, the diameters are too small or when the interior of the mandrel is already utilized for other purposes (heating core, cooling core, etc.) or further when the mandrel must be solid to better resist stresses.

SUMMARY OF THE INVENTION

It is therefore an object of the invention to provide a novel means which makes it possible to maintain in position and/or to displace the counterpart, hereinafter designated as the counter-knife, without it being mechanically connected to an exterior means.

According to the invention a tube truncation apparatus is provided which comprises at least one knife adapted to cooperate at the end of its cutting extent with a counter-knife disposed on the interior of a tube to be cut. The counter-knife ia associated with a magnetizable core, and a magnetic induction means adapted to create a magnetic field in the core across said tube to longitudinally affect the position of the core and correspondingly said counter-knife is provided.

The core may be longitudinally spaced from the counter-knife but is mechanically associated therewith such that longitudinal movement of the core longitudinally moves the counter-knife.

The core and the counter-knife may be mechanically associated by means of a linkage means allowing for substantially free rotation of the counter-knife relative to the core.

In one embodiment of the invention the magnetic induction means comprises an energizable winding wound in a body extending around the tube to create at least substantially longitudinal induction lines in the core. At least one knife has a fixed longitudinal position to truncate unitary tubes, and the magnetic induction means has a fixed longitudinal position and creates induction lines of substantially constant shape and longitudinal position in the core, so as to maintain the core and thereby said counter-knife in a substantially fixed longitudinal position within the tube. In this embodiment the core and the counter-knife are connected by a rigid element which is non-magnetic which is fixed in a longitudinal fashion to the core and the counter-knife In this instance the rigid element allows for free rotation of the counter-knife relative to the core.

Generally speaking, the at least one knife is positioned on one side of the magnetic induction means, and the apparatus further comprises supply and advancement means to supply tubes in a unitary fashion to the apparatus to be cut and advanced by a desired length as a function of the length of truncated tubes to be obtained. The supply and advancement means may comprises a pusher positioned on the opposite side of the at least one knife from the magnetic induction means adapted to push and advance the tube by the desired length so as to allow for evacuation of the tube portion cut by the at least one knife on the side of the at least one knife opposite the pusher.

According to another series of embodiments the apparatus is specifically adapted for truncating continuously formed tubes, such as those formed by a spiraler or the like. In this case, the at least one knife is mounted to be moved longitudinally at the moment of truncation, in a synchronous manner with the advancement of the tube in the course of manufacture.

In this continuous embodiment, one form of apparatus according to the invention includes magnetic induction means which is adapted to create a magnetic field of variable position, and further comprises means for sequencing the displacement of the field, and consequently the position of said core and said counter-knife, to the truncation cycle. To accomplish this the induction means may be mounted on a longitudinally movable carriage. The core and counter-knife are connected to one another by a rigid linkage means which is non-magnetic and which longitudinally fixes the core and the knife relative to one another, and the sequencing means sequences the movement of the knife, core and the counter-knife, to follow in a synchronous fashion the movement of the tube during at least the action of the latter. The sequencing means is further adapted to return the carriage, and thus the counter-knife, into an initial position after each truncation for a new truncation cycle. By virtue of the rigid linkage the core and counter-knife are in fixed relative longitudinal relationship to one another.

Depending upon the manner of continuous supply the apparatus may further include means for rotating the tube to allow for cutting under the action of the at least one knife.

In another continuous supply embodiment the at least one knife is mounted to be moved longitudinally at the moment of truncation, in a synchronous manner with the advancement of the tube in the course of manufacture, and the magnetic induction means is adapted to create a magnetic field of fixed position. To move the core a movable tubular element made of a magnetizable material is concentrically mounted so as to be longitudinally movable around the tube to be truncated. The tubular element has a portion which is of low magnetizability of a length which is preferably at most equal to the length of the core. The apparatus further comprises sequencing means for sequencing the movement of the tubular element to the truncation cycle such that the displacement of the tubular element in the magnetic field of the induction means causes the displacement of the core.

In this embodiment the core and counter-knife may be connected to one another by a rigid linkage means which is non-magnetic which longitudinally fixes the core and the knife relative to one another. In this case the sequencing means sequences the movement of the core and thus the counter-knife to follow in a synchronous fashion the movement of the tube and of the knife during at least the action of the latter. The sequencing means is further adapted to bring back the tubular element, and thus the counter-knife, into the initial position after each truncation for a new truncation cycle.

According to another continuous embodiment the at least one knife is mounted to be moved longitudinally at the moment of truncation, in a synchronous manner with the advancement of the tube in the course of manufacture. Here the magnetic induction means is adapted to create a magnetic field of fixed position. A movable tubular element made of a magnetizable material is mounted so as to be longitudinally movable around the tube to be truncated. The tubular element has a portion which is of low magnetizability of a length which is preferably at most equal to the length of the core. The counter-knife is dimensioned to be pulled by the tube in the course of its advancement such that the counter-knife, the at least one knife and the tube are moving substantially simultaneously when the at least one knife is applied to truncate the tube. The apparatus further comprises sequencing means for sequencing the movement of the tubular element to the truncation cycle such that the displacement of the tubular element in the magnetic field of the induction means causes the displacement of the core. In this embodiment the core and counter-knife are connected to one another by a linkage means which is non-magnetic which allows for relative longitudinal movement between the core and the counter-knife, and the sequencing means sequences the movement of the tubular element to return the core and thereby the counter-knife to an initial position after truncation. The sequencing means is further adapted to advance the tubular element from its initial position to in turn move the core, but not the counter-knife, from the initial position to its final position, thereby allowing for advancement of the counter-knife without advancement of the core over a predetermined extent.

In yet another continuous supply embodiment the at least one knife is mounted to be moved longitudinally at the moment of truncation, in a synchronous manner with the advancement of the tube in the course of manufacture. The magnetic induction means is mounted on mobile means adapted to create a magnetic field of movable position, while the counter-knife is dimensioned to be pulled by the tube in the course of its advancement such that the counter-knife, the at least one knife and the tube are moving substantially simultaneously when the at least one knife is applied to truncate the tube. The counter-knife and core are connected by linkage means whereby said counter-knife and core are movable longitudinally relative to one another within the tube. The linkage means is configured to permit advancement by the counter-knife in the direction of movement of the tube, without movement of the core for an during truncating. Here the apparatus further comprises sequencing means for sequencing the movement of the magnetic induction means to move the core to pull back the counter-knife to an initial position through the linkage means, and for then advancing the core relative to the linkage means and the counter-knife to a final position of the core so as to allow for the substantially free movement of the counter-knife relative to the core over the extent in the direction of travel of the tube.

Such a linkage means comprises a rigid slide rod on which the core is slidable, said rod ending in an abutment whereby return of the core to the initial position pulls against the abutment to tension the slide rod to return the counter-knife to its initial position.

The invention is further directed to a method of truncating tubes comprising the steps of:

(a) supplying a tube to be truncated;

(b) truncating the tube with at least one knife adapted to cut through the tube against a counter-knife magnetically positioned within the tube.

The counter-knife is associated with a magnetizable core, and said method comprises magnetically positioning the counter-knife by magnetizing the core to position the core and correspondingly the counter-knife.

Unitary tubes may be provided by pushing the tubes relative to the counter-knife by a desired amount while the counter-knife is maintained in a substantially fixed position.

In another embodiment, the tube is supplied continuously and the core and counter-knife are in fixed relative longitudinal relation to one another. The method comprises continuously moving the core and counter-knife longitudinally within the tube by applying a moving magnetic field to the core. In one embodiment the tube is surrounded by an energizable winding which is longitudinally displaceable together with the at least one knife relative to the tube. The method comprises energizing the winding and moving the winding longitudinally together with the tube to move the core and the counter-knife at substantially the same longitudinal speed as the tube, and applying the at least one knife to the tube while the knife and counter-knife are moving at substantially the same longitudinal speed as the tube.

Alternatively, the tube is surrounded by a fixed energizable winding and a tubular element concentrically positioned between the tube and the winding. The tubula element has a portion of low magnetizability positioned concentrically between the core and the winding. The method comprises energizing the winding and longitudinally moving the tubular element at substantially the same longitudinal speed as the tube to thereby move the core and correspondingly the counter-knife.

In another embodiment the counter-knife is associated with a magnetizable core, and the core and counter-knife are longitudinally movable relative to one another. The method comprises continuously supplying the tube and advancing the counter-knife by pulling the counter-knife at substantially the same speed as the tube by means of the interior of the moving tube. The core is fitted within the tube tightly enough to be longitudinally pulled by the tube from an initial position to a final position at which point the method comprises truncating the tube by applying the knife against the counter-knife while moving the knife longitudinally at substantially the same speed as the counter-knife. The magnetizable winding is movable to generate a moving magnetic field, and the method comprises energizing the winding and moving the winding to return the core from its final position to an initial position to pull back the core to its initial position and subsequently advancing the core without advancing the counter-knife whereby the counter-knife is free to move relative to the core during truncating without moving the core.

Rather than moving the winding, in a modified embodiment the magnetizable winding is fixed and is adapted to generate a fixed magnetic field. A movable tubular element is positioned concentrically between the winding and the tube. The tubular element comprises a non-magnetizable portion positioned to surround the core in its final position. The method comprises energizing the winding and moving the tubular element to return the core from its final position to an initial position to pull back the core to its initial position and subsequently advancing the core without advancing the counter-knife whereby the counter-knife is free to move relative to the core during truncating without moving the core.

BRIEF DESCRIPTION OF DRAWINGS

The invention will be better understood with particular reference to the description which follows taken in conjunction the annexed drawings in which.

DESCRIPTION OF PREFERRED EMBODIMENTS

Figure 1:
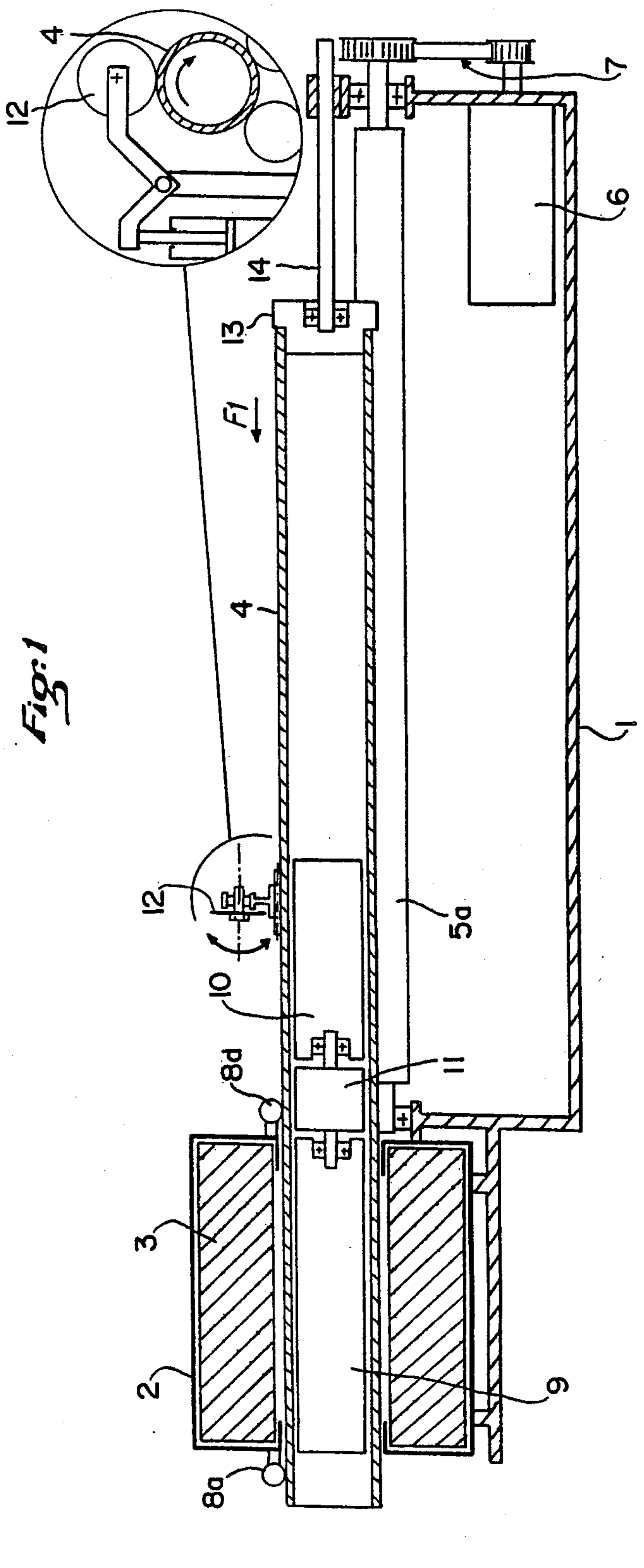
FIG. 1 is an elevational view schematically showing one embodiment for truncating individual or unitary tubes.

According to one embodiment of the invention the truncation apparatus according to the invention is notable in that the counter-knife is mechanically connected to a highly magnetizable core, while a magnetic induction means is provided to create a magnetic field in the core across the tube to be truncated in a manner so as to be able to act magnetically on the longitudinal position of the core and likewise on the counter-knife as a function of the longitudinal position of the knife.

Preferably, the magnetic induction means comprises a reel wound in a body around the tube to be truncated in a manner so as to create induction lines which are at least substantially longitudinal in the core.

According to a first embodiment provided with at least one knife having a fixed longitudinal position for the truncation of unitary tubes, the magnetic induction means has a fixed longitudinal position and creates induction lines of shapes and longitudinal positions which are constant, while the core and the counter-knife are connected by a non-magnetic rigid element which is fixed in a longitudinal integral manner to the core and to the counter-knife.

Preferably in this case, the attachment or linkage means of the rigid element to the counter-knife and/or to the core is free to rotate, in a manner so as to allow for a free rotation of the counter-knife relative to the core.

Preferably, the one or more knives are positioned on one side of the magnetic induction means. A pusher is provided, preferably on the side of the knives, to provide in a unitary fashion the apparatus with tubes to be truncated and to advance each tube the desired length as a function of the truncated portions to be obtained. Evacuation of the cut truncations occurs on the opposite side of the pusher with respect to the induction means.

It is clear that with such an apparatus, one takes advantage, relative to the prior art, of an inlet side and an outlet side, which allows for continuous supply and which facilitates in particular the counting, the sorting of waste, the stacking of the truncated tubes, etc.

However, the invention also relates to a truncation apparatus for truncating a continuously formed tube, the one or more knives being moved longitudinally at the moment of truncation in a synchronous manner with the advancement of the tube in the course of manufacture.

For this application, the invention provides that the magnetic induction means be adapted in a manner so as to create a magnetic field which is variable in position, the displacement of the field and consequently that of the core being sequenced to the truncation cycle.

To accomplish this, the induction means is, for example, mounted on a longitudinally mobile carriage whose movement is sequenced to the truncation cycle However, when the tube to be cut has a diameter and/or a thickness which is elevated, the size, and consequently the weight of the induction means likewise becomes substantial such that the movement of the induction means is difficult.

It is for this reason that the invention proposes in this particular embodiment that the induction means have a fixed longitudinal position and in that a tubular element made of a highly magnetizable material is mounted in a manner so as to be movable longitudinally around the tube to be truncated. The tubular element has a portion of low magnetizability, of a length which is preferably at most equal to that of the core, while the movement of the tubular element is sequenced to the truncation cycles such that the displacement of the tubular element in the magnetic field of the induction means causes the displacement of the core which channels the induction lines going through the portion of high magnetic susceptibility of the tubular element.

In the case of a carriage or a mobile tubular element, the core and the counter-knife can be connected to one another by means of a rigid non-magnetic element which is fixed in an integral manner longitudinally to the core and to the counter-knife while the carriage, or respectfully the tubular element is sequenced to the movement of the tube, in a manner such that the core and thus the counter-knife follow in a synchronous manner the movement of the tube and of the knife during at least the action of the latter. Sequencing is provided to bring the carriage, or respectively the tubular element, and thus the counter-knife, back to the initial position after each truncation for a new truncation cycle.

However, it is also possible that the core and the counter-knife be connected in a manner such that the counter-knife can be freely spaced by a certain length from the core while the carriage, or respectively the tubular element, is sequenced to the truncation cycle in a manner such that the core advances rapidly by a certain length before the action of the knives as they approach the counter-knife. The exterior diameter of the counter-knife is substantially equal to the interior diameter of the tube such that the counter-knife can be freely moved by the tube itself thus spacing itself from the core during the truncation. A sequencing means is provided to return the carriage, or respectfully the tubular element, and thus the counter-knife, into the initial position after each truncation for a new truncation cycle.

In this last case, the core and the counter-knife are, for example, connected between them by a cable such that the advancement of the core creates a movement in the cable allowing for a free advancement of the counter-knife and that a return toward the rear by the core creates a tension in the cable allowing the counter-knife to be brought back.

According to an alternative, the cable is replaced by a rigid linkage rod which freely slides in the core such that the advancement of the core occurs by sliding without acting on the counter-knife while an abutment is provided ahead of the core in a manner such that a rearward return of the core brings back the counter-knife by pulling the linkage rod by means of the abutment.

Figure 2:
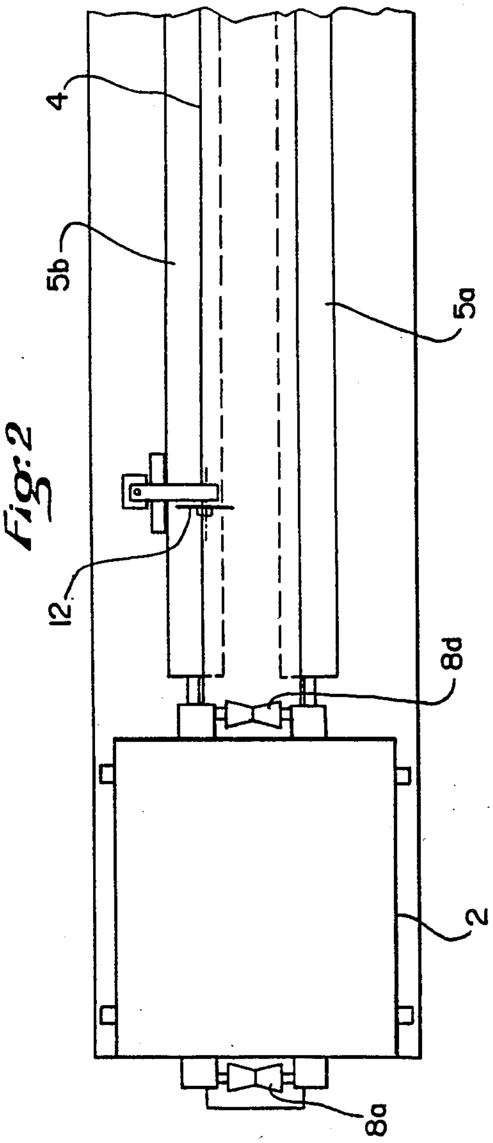
FIG. 2 is a top view of FIG. 1.
Figure 3:
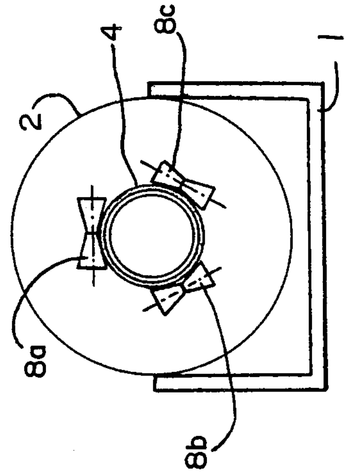
FIG. 3 is an end view (from the reel side) of FIG. 1.

FIGS. 1–3 illustrate a frame 1 which supports in a fixed manner, a body 2 which encloses a reel winding 3 made of copper wire, positioned in a manner so as to surround the tube 4 to be truncated.

Tube 4 is shown in longitudinal cross-section (as is the body 2) to illustrate the interior.

Tube 4 can be rotated by means of drive rollers **5*a* and 5*b* (FIGS. 1 and 2) which are themselves activated by a motor 6 and by means of a gear train 7 (FIG. 1**).

Tube 4 is furthermore maintained and centered by rollers **8*a*–8*d* which are provided on body 2 (8*a* and 8*d* are visible in FIGS. 1 and 2 and 8*a*–8*c* are visible in FIG. 3, while two other rollers which are not visible correspond to rollers 8*b* and 8*c* which are provided on the other side of body 2**).

The configuration of the rollers as shown in the drawings is adapted to allow both for the longitudinal displacement and rotation of tube 4.

A core 9 which is highly magnetizable, such as soft iron, is positioned within tube 4 and is connected mechanically to a counter-knife 10 by means of a linkage element 11 made of non-magnetic material (for example of aluminum). The mechanical linkages between the core 9 and the element 11 and between the latter and the counter-knife 10 are such so as to assure on the one hand a free rotation of these three elements with respect to one another (by means of roller elements) but, on the other hand, a longitudinal solidarity such that the counter-knife 10 can be activated in rotation with tube 4 without moving core 9.

On top of tube 4, on the side opposite roller **5*a*, 5*b* is provided in a longitudinally fixed manner, a knife 12 (FIGS. 1 and 2**) in the form of a disk.

As is shown more particularly in detail in FIG. 1, knife 12 is pivotably mounted so as to be able to penetrate through the thickness of tube 4.

On the opposite side of body 2 is furthermore provided a pusher 13 which is mounted to freely rotate at the end of an activation shaft 14, guided in chassis 1. In the embodiment described with reference to FIGS. 1–3, each tube is provided by a pusher 13, while shaft 14 is activated in the direction of arrow Fl (FIG. 1) in a manner so as to appropriately position the tube relative to knife 12.

It is thus possible to make one or more truncations by activating knife 12 after rotating the tube. Each truncation is then evacuated by pusher 13 on the side opposite to the latter with respect to body 2.

The soft iron core 9 is maintained in position by virtue of the corresponding magnetic field created by reel 3 through which an electric current runs such that the counter-knife 10 remains in proper position with respect to knife 12.

It is clear of course that it is possible to utilize a plurality of knives 12 in a manner so as to form rings of knives, for example.

Likewise, the one or more knives and the counter-knife may be positioned on the other side of body 2.

This apparatus is particularly of value because on one side of the body the tubes are supplied, while on the other side the truncated tubes are recovered.

Figure 4:
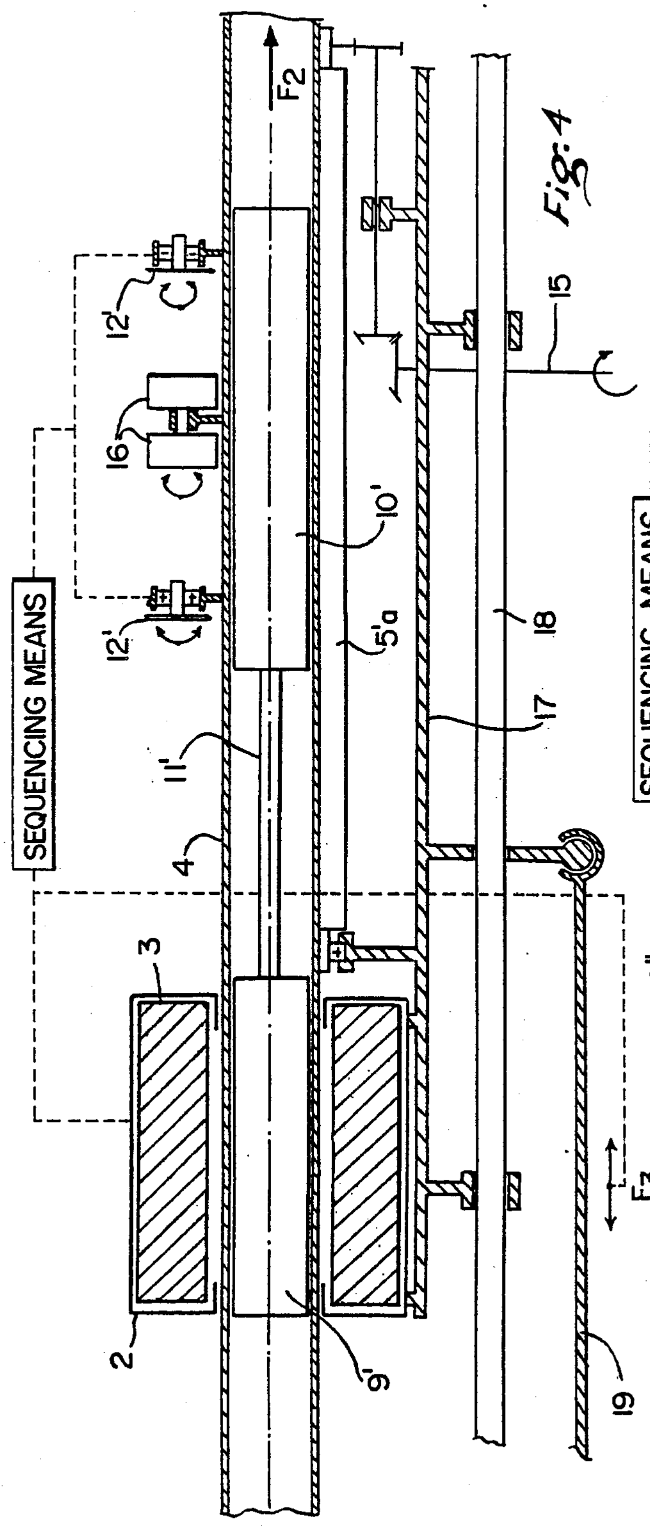
FIG. 4 schematically illustrates an elevational view of a first embodiment, for truncation of a continuously formed cardboard tube.
Figure 5:
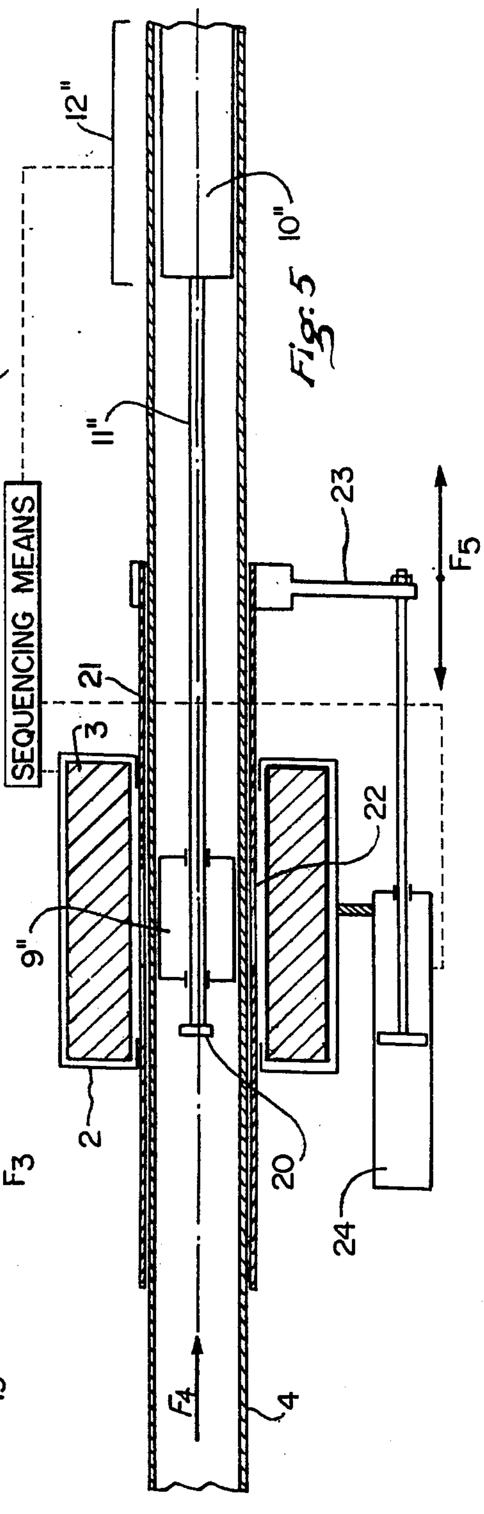
FIG. 5 schematically illustrates an elevational view of a second embodiment, for truncation of a continuously formed cardboard tube.

FIGS. 4 and 5 illustrate two embodiments which are more particularly adapted to truncation apparatus which are adapted for use with continuous fabrication spiralers of cardboard tubes and more generally, for machines in which the unitary tube or tube in fabrication is moved longitudinally during cutting.

In this case, the one or more knives are likewise moved longitudinally to follow the tube during cutting by means of a linkage means (not shown). It is thus necessary that the counter-knife follow the movement of the tube.

To this end, the embodiment of FIG. 4 has, as seen in FIG. 1, a body 2 provided with a reel 3 while a soft iron core 9' is mechanically connected to a counter-knife 10' by means, in this embodiment, of a non-magnetic rod 11' which may be free to rotate on core 9' and/or on counter-knife 10'.

This apparatus likewise comprises knives 12' (two are shown). If desired an inlet schematically shown at 15 is provided for rotating the drive rollers, such as **5'*a* with, in addition, pressure rollers 16**.

In this apparatus, knives 12' are operated in a synchronous fashion with the advancement of tube 4 in the direction arrow $F_2$ by means of a linkage which may be associated with carriage 17.

To allow for counter-knife 10' to follow tube 4 as well, body 2 is here fixed on a mobile carriage 17 which is guided on tracks 18 of a fixed chassis.

Carriage 17 is driven by a reciprocating crank system 19 in a synchronous manner with the advancement of tube 4 (by a sequencing means not shown).

It is clear that rod 11' makes it possible to longitudinally link core 9' and counter-knife 10' such that the latter can follow tube 4 and knives 12' in their longitudinal translational movement because carriage 17 transports reel 3 whose magnetic field causes core 9' to follow the movement of the reel.

Means are obviously provided to return carriage 17 and knives 12' into their initial position for a new truncation cycle, the carriage having a reciprocating movement along the direction of double arrow $F_3$ of FIG. 4.

In the embodiment which has just been described, the tube is rotated in the course of its manufacture by spiraling such that means 15 and 5'*a* are not required.

FIG. 5 shows another particularly advantageous and original embodiment because it makes it possible to have a fixed induction means (body and reel) while nevertheless allowing for movement of the core.

Here again body 2, reel 3, tube 4, a cutting platen having one or more knives schematically shown at 12", a core of soft iron 9" and a counter-knife 10" here connected to the core by a rod 11" are shown.

In this embodiment however core 9" has a longitudinal dimension which is less than that of the preceding embodiments, while rod 11" traverses core 9" and has at its free end an abutment 20.

In this embodiment, a tube 21 made of highly magnetically susceptible material (soft iron, steel . . . ) is coaxially mounted around a tube 4 to be truncated.

Tube 21 has in its central portion, a ring 22 made of material of only very slight or no magnetic susceptibility (of copper for example) while the tube is mounted on a carriage 23 which is mounted to slide longitudinally and activated for example by a jack 24 in a manner so as to follow the movement of the tube along the direction of arrow $F_4$. Carriage 23 will also have a reciprocating movement along double arrow $F_5$ in a manner which will be described below.

As opposed to FIG. 4, it will be noted that in FIG. 5 body 2 and reel 3 are fixed and it is thus possible to utilize heavy means for tubes of large diameter, for example.

When tube 21 is moved by carriage 23, induction lines traverse the magnetic portion of the tube and are channeled by core 9", the said lines going around ring 22.

As a result, core 9" follows the displacement of tube 21.

In the embodiment shown in FIG. 5, rod 11" slides in core 9" such that the counter-knife 10" is not influenced by the movement of the core 9" in the direction of arrow $F_4$. On the contrary, it is clear that a return in the other direction will allow core 9" to pull on the counter- knife 10" by virtue of abutment 20 of rod 11".

This arrangement applies particularly to the apparatus described in French Patent 83 07802 in the name of the same inventor (corresponding to U.S. Pat. No. 4,591,405), the disclosure of which is incorporated by reference thereto, in which the counter-knife is driven or pulled during the cut by the tube itself, then brought back in the opposite direction for a new cycle. In this case, it suffices that tube 21 undergo a rapid movement towards the counter-knife 10", such that counter-knife 10" is simply pulled by tube 4. For this to occur the diameters of the counter-knife are appropriately selected, while sequencing means are provided to abruptly return carriage 23 into the initial position after each truncation. Because of the inertia associated with pulling both the core and counter-knife in this embodiment when returning the core to begin the cycle once again, the core is returned beyond the position shown in FIG. 5 in the direction opposite to $F_4$ to pull rod 20 back to the initial position shown in FIG. 5. Tubular element 21 is then advanced to bring core 9" to the final position shown in the Figure. In this way counter-knife 10" is then free to be drawn by tube 4 without core 9" advancing as well to the point at which the cut is made.

The same result may be achieved by replacing rod 11" by a simple cable having sufficient slack therein to allow for movement of the counter-knife 10" without movement of the core under the effect of tube 4.

It is clear that linkage element 11 and rod 11' of the embodiments of FIGS. 1–4 respectively are interchangeable.

Figure 6:
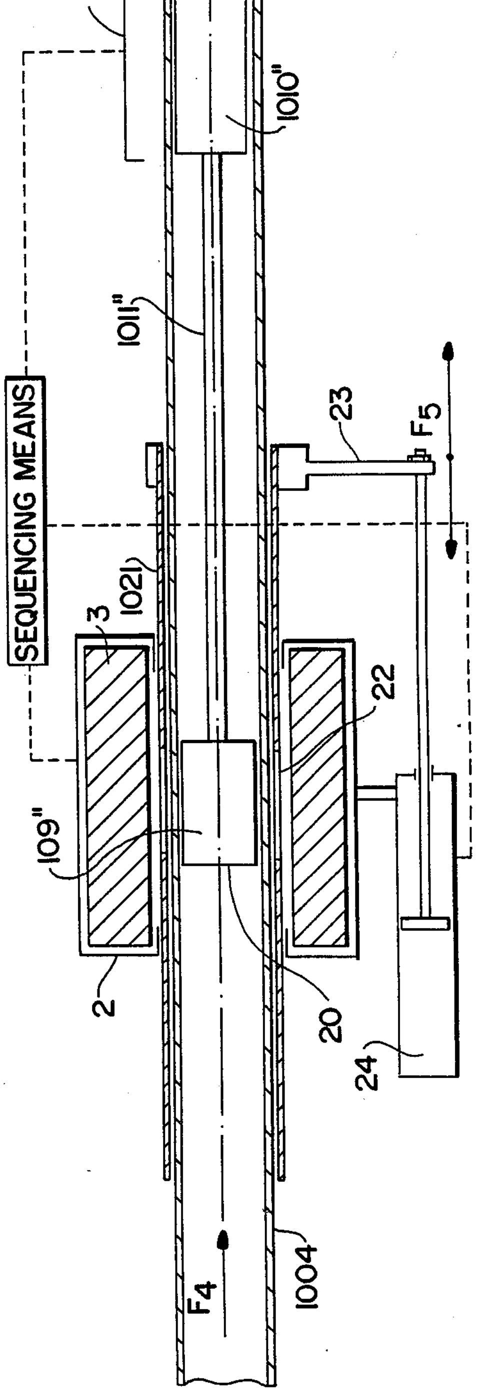
FIG. 6 schematically illustrates an alternative embodiment to that of FIG. 5 in which the core and counter-knife are in a longitudinally fixed relationship to one another.

As shown in the embodiment of FIG. 6 it is of course possible to have tubular element 1021 move synchronously with tube 1004, the linkage between core 109" and counter-knife 1010" being made longitudinally rigid by means of rod 1011" of the type described in FIG. 1 or of a rod of the type described in FIG. 4. In this embodiment knives 1012" are moved synchronously with tube 1004 by means not shown. Elements not otherwise marked are identical to those of FIG.5.

Figure 7:
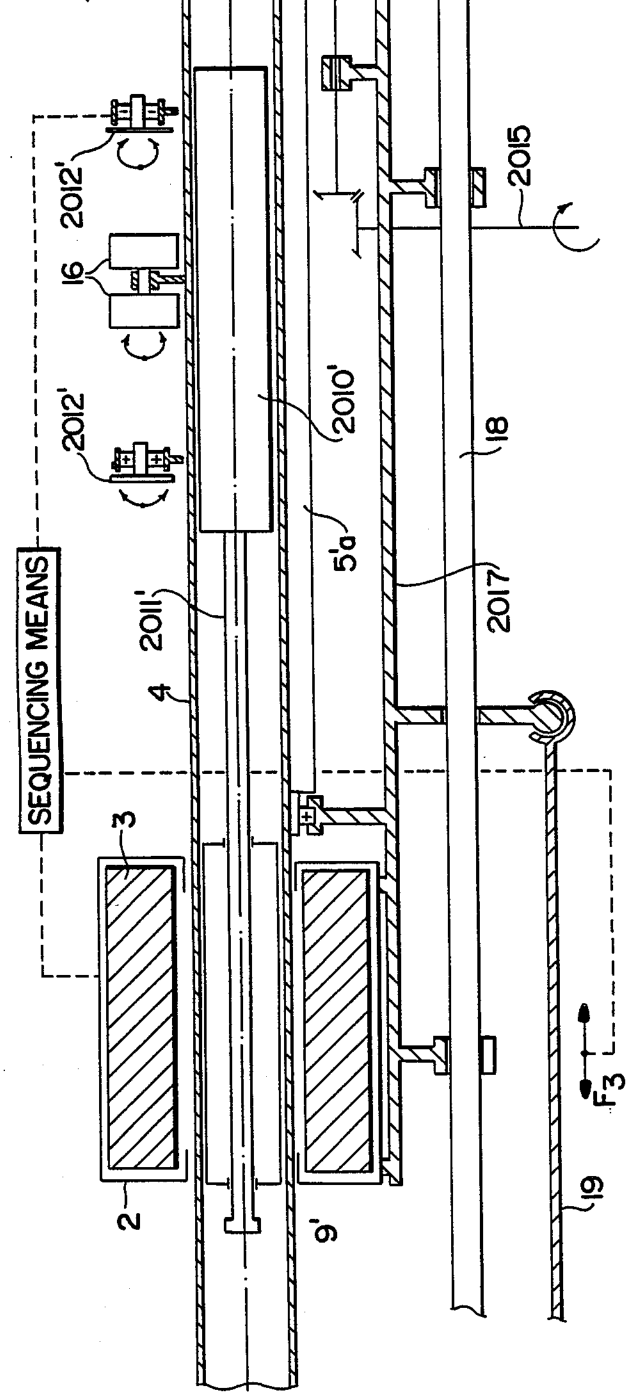
FIG. 7 schematically illustrates an alternative embodiment to that of FIG. 4 in which the counter-knife and core are in movable relative to one another in the longitudinal direction.

Finally, in the embodiment of FIG. 7, rod 11' of FIG. 4 can be replaced by a cable or a sliding rod 2011' of the type of rod 11" of FIG. 5, the carriage 2017 having a movement of the type described with reference to carriage 23 of FIG. 5. Knives 2012' are, in this embodiment, moved synchronously with the continuously moving tube and counter-knife 2010'. Depending upon the manner in which the tube is supplied, i.e., spiraler or otherwise, rotational means 2015 may or may not be necessary. Elements not otherwise identified are identical to those of FIG. 4.

It should be noted that the invention relates principally, but not exclusively, to tubes made out of cardboard.

Furthermore, the tubes can have a circular or polygonal cross section. In the latter case, the rotational means provided in FIG. 1 can, for example, be replaced by a rotatably mounted pusher.

Additionally, although the invention has been described with reference to particular means, materials and embodiments, it is to be understood that the invention is not limited to the particulars disclosed and extends to all equivalence within the scope of the claims.

I claim:

1. Apparatus for truncating tubes, said apparatus comprising at least one knife, said knife having a cutting portion which is adapted to cooperate with counter-knife which is positioned along the interior of a tube to be cut by said knife, said counter-knife being connected to a magnetizable core by a rigid element and for permitting free rotation of said counter-knife with respect to said magnetizable core, said apparatus including magnetic induction means for creating a magnetic field in the core, across said tube, for changing the longitudinal position of said core and said counter-knife within said tube, relative to the tube as the tube moves, said apparatus further comprising means for moving said tube, means for cutting said tube transversely with aid knife, and means for fixing said knife in a longitudinal position with respect to said tube when said tube is cut by said knife.

2. Apparatus in accordance with claim 1, wherein said core is longitudinally spaced from said counter-knife, said core and said counter-knife being mechanically connected such that longitudinal movement of said core effects longitudinal movement of said counter-knife.

3. Apparatus in accordance with claim 1, wherein said magnetic induction means comprises an energizable winding which is wound in a body, said body extending about said tube to effect a plurality of substantially longitudinal induction lines within said core.

4. Apparatus for truncating tubes, said apparatus comprising at least one knife, said knife having a cutting portion which is adapted to cooperate with a counter-knife which is positioned along the interior of a tube to be cut by said knife, said counter-knife being associated with a magnetizable core, said apparatus including magnetic induction means for creating a magnetic field in the core, across said tube, for changing the longitudinal position of said core and said counter-knife within said tube, wherein said magnetic induction means is fixed at a predetermined longitudinal position and comprises means for creating induction lines of substantially constant shape and longitudinal position within said core, said apparatus further comprising means for moving said tube, means for cutting said tube transversely with said knife, means for fixing said knife in a longitudinal position with respect to said tube when said tube is cut by said knife, and means for maintaining said core and said counter-knife in a substantially fixed longitudinal position within said tube, said core and said counter-knife being both longitudinally and rigidly connected together, wherein said core and said counter-knife are connected together by a rigid element which comprises means for permitting free rotation of said counter-knife with respect to said core.

* * * * *